(12) United States Patent
Chunekar et al.

(10) Patent No.: US 12,056,013 B2
(45) Date of Patent: Aug. 6, 2024

(54) EFFICIENT MANAGEMENT OF SPECIALIZED CONTROL FILES USED FOR BACKUP RESTORE

(71) Applicant: Dell Products L.P., Round Rock, TX (US)

(72) Inventors: Shraddha Chunekar, Bangalore (IN); Navneet Upadhyay, Ghaziabad (IN); Iresha Gadikar, Bijapur (IN); Amith Ramachandran, Bangalore (IN); Haritha Kora, Pulivendula (IN); Rejith Mohan M, Thiruvanathapuram (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/962,648

(22) Filed: Oct. 10, 2022

(65) Prior Publication Data

US 2024/0118976 A1 Apr. 11, 2024

(51) Int. Cl.
*G06F 16/00* (2019.01)
*G06F 11/14* (2006.01)

(52) U.S. Cl.
CPC .............. *G06F 11/1448* (2013.01)

(58) Field of Classification Search
None
See application file for complete search history.

(56) References Cited

U.S. PATENT DOCUMENTS

2021/0240583 A1* 8/2021 Upadhyay ........... G06F 11/1469
2022/0121523 A1* 4/2022 Upadhyay ........... G06F 11/1448

* cited by examiner

*Primary Examiner* — Anhtai V Tran
(74) *Attorney, Agent, or Firm* — Dergosits & Noah LLP; Todd A. Noah

(57) ABSTRACT

Described is a system for management of specialized files used for a backup restore. The system may allow for an automated recovery to be performed without having to manually identify critical information required to perform a restore of a particular backup within a backup chain. This information may include a control file and a parameter file. A backup agent may store such information within specialized objects that are stored as part of metadata managed by a backup agent to provide an additional layer of recover capability and efficiency. This information may then be leveraged for retrieval during a restore operation, for example, in a disaster recovery scenario.

20 Claims, 4 Drawing Sheets

200

- 201 Monitor backups of a database performed by a database system, each of the backups of the database stored to a remote storage system as part of a backup chain
- 202 Identify, after each backup, a corresponding control file and parameter file created by the database system as part of the backup.
- 203 Store, after each backup, information of the corresponding control file and parameter file as part of an object associated with the backup, the object stored as part of metadata managed by the backup agent
- 204 Receive a request to initiate a restore of the database to a point in time
- 205 Identify a particular backup of the database based on the point in time
- 206 Retrieve the information of the corresponding control file and parameter file from the object associated with the particular backup of the database
- 207 Initiate the restore of the database from the remote storage system using the retrieved information of the corresponding control file and parameter file

FIG. 2

| 300 | | | |
|---|---|---|---|
| *controlSpFileInfo* | object | Y | The relative Path of Control File, SPFile, and Autobackup File pieces. <table><tr><td>*ControlFilePath*</td><td>string</td><td>Y</td><td>The relative path of control file piece. May be an empty value by default.</td></tr><tr><td>*SPFilePath*</td><td>string</td><td>Y</td><td>The relative path of parameter file piece. May be an empty value by default.</td></tr><tr><td>*AutoBackupPath*</td><td>string</td><td>Y</td><td>The relative path of auto backup piece. May be an empty value by default.</td></tr></table> |
| *hasControlFile* | bool | Y | Boolean to indicate if control file is part of backup copy of database. It can be explicitly present, part of *autobackup* piece, or both. |
| *hasSPFile* | bool | Y | Boolean to indicate if parameter file is part of backup copy of database. It can be explicitly present, part of *autobackup* piece, or both. |

FIG. 3

EFFICIENT MANAGEMENT OF SPECIALIZED CONTROL FILES USED FOR BACKUP RESTORE

TECHNICAL FIELD

This disclosure relates to database backup systems, and more particularly, managing specialized control files that are referenced when performing a database restore.

BACKGROUND

Data storage systems (or on-demand storage services) may provide various tools that are crucial for enterprise level network clients. For example, clients may rely on such systems to efficiently back up and recover data in the event of user error, data loss, system outages, hardware failure, or other catastrophic events to allow business applications to remain in service or quickly come back up to service. As part of managing such a data storage service, providers may implement various data protection tools. For example, some tools (e.g., Dell EMC PowerProtect) may provide software defined data protection, automated discovery, deduplication, operational agility, and other functionality for physical, virtual, and cloud environments. These tools may work with in conjunction with a recovery manager provided by a specific database system (e.g., Oracle Recovery Manager (RMAN) as part of the Oracle database system). However, these recovery managers may require certain information to perform a restore of backup data. In some circumstances, identifying such critical information may require a user to manual provide such information, which may be burdensome. In addition, such critical information may not always be directly accessible depending on the recovery scenario. Moreover, even when such information is identified, a complicated manual process may be required for the recovery. For example, a backup administrator may have to manually identify the correct restore information and generate appropriate recovery manager scripts to recover the database to a certain state.

Thus, there is a continued need to provide efficient disaster recovery mechanisms when working in conjunction with certain recovery managers provided by database systems.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 2 is a process flow diagram illustrating an example process flow for managing specialized control and parameter files used for a backup restore according to one or more embodiments of the disclosure.

FIG. 3 is a flow diagram illustrating an example of the layout of a specialized object used to store information of the control file and parameter file according to one or more embodiments of the disclosure.

DETAILED DESCRIPTION

Figure 1:
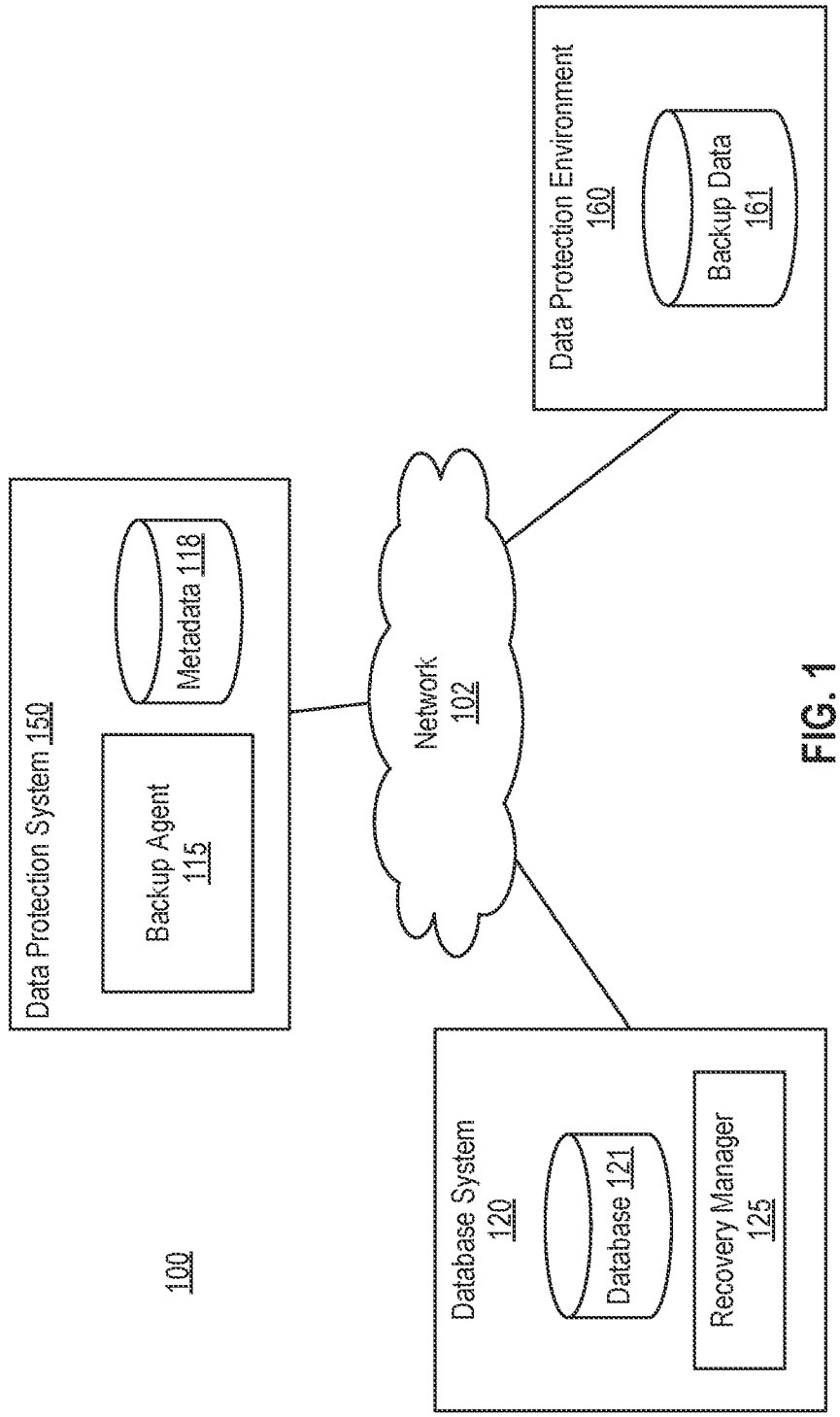
FIG. 1 is a block diagram illustrating an example operating environment for managing critical information required for a restore operation according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for efficient management of specialized files used for a backup restore. The system may allow for an automated recovery to be performed without having to manually identify critical files required to perform a restore of a particular backup within a backup chain. To provide such an ability, in some embodiments, the system may include a backup agent that intelligently identifies certain files such as a control file and a parameter file after each backup is performed by a database system. This information may then be automatically retrieved during a restore operation. The backup agent may work in conjunction with a recovery manager (e.g., Oracle Recovery Manager or "RMAN") of a database system (e.g., Oracle database system) that requires a control file and parameter file in order to correctly restore a database. The backup agent may correctly identify such files by performing a specialized query after the database system performs each backup. The backup agent, which may be part of a data protection service/platform, may then store information of the control file and parameter file as part of metadata managed by the backup agent. In other words, such metadata may be stored and managed by the backup agent separately from recovery information maintained by the database system to provide an additional layer of recovery capability and efficiency. For example, the system may initiate a complete restore operation without having to access the production database environment. In one embodiment, the information of the control file and parameter file may be stored as a specialized object. For example, the object may store information on whether each file is present, and a storage location of each file. In addition, the information may be associated with each backup such that when a restore request is received, the backup agent may identify an appropriate (or correct) backup (e.g., backup instance or version) within a backup chain that may be formed from various types of backups such as full, incremental, differential, logs, etc. For example, a restore may be performed based on a particular point in time, and the backup agent may intelligently identify the appropriate backup, and thus, a user (e.g., backup admin) is not burdened with having to identify the correct backup within the chain.

Accordingly, once a restore request is received, for example, in a disaster recovery scenario, the system may efficiently identify a particular backup within the backup chain, and then retrieve critical information for the restore process such as control file and parameter file information in an automated manner. This critical information may then be used to perform a restore of the appropriate backup. Thus, the system may provide the ability to perform an automated restore by efficiently identifying and storing critical information, and then automatically retrieving such information to initiate a recovery in various circumstances including a disaster recovery scenario.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines, or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g., Solid State Drive (SSD), Hard Disk Drive (HDD)), which may include virtual storage systems provided by a cloud service provider.

More specifically, and with reference to FIG. 1, shown is a block diagram illustrating an example of an operating environment 100 for managing critical information required for a restore operation according to one or more embodiments of the disclosure.

As shown, the operating environment 100 may include a database system 120, a data protection system 150, and a data protection environment (or remote storage system) 160, which may be a remote storage system (e.g., cloud-based storage service/platform). It should be noted that the components of operating environment 100 may interact via a network 102, which may be any type of wired or wireless network including a local area network (LAN), a wide area network (WAN), or a direct communication link, or other suitable connection.

The database system 120 may include (or be associated with) a database (or target database/instance) 121 from which data to be protected (e.g., backed-up) originates. As further described herein, the database 121 may be backed up to the data protection environment 160 and stored as part of backup data 161. The database system 120 may perform a backup of the database via a recovery manager 125. The backup agent 115 may be part of a data protection system 150 that works in conjunction with the recovery manager 125 to provide an additional layer of data protection (e.g., disaster recovery). The backup agent 115 may store and/or access specialized metadata 118 to perform an efficient restore as further described herein. For example, the backup agent 115 may store information of a control file and/or parameter file for a particular backup within an object stored as part of the metadata 118.

In some embodiments, the data protection system 150 may include one or more components that are associated with providing data protection and recovery services. For example, in addition to the backup agent 115, the data protection system 150 that may include a backup server or appliance (not shown). The data protection system 150 may be an on-premises (e.g., maintained by a customer or client of the data protection and recovery services), or part of a cloud-based system provided as part of an on-demand service. The data protection system 150 may direct (or control, initiate, etc.), or work in conjunction with, other components of the operating environment 100 to perform various operations as further described herein. In addition, the data protection system 150 may provide an interface (e.g., application programming interface (API), graphical user interface (GUI), command line interface (CLI), etc.) that allows a user to interact with the backup system 150, or particular components thereof. In some embodiments, the data protection system 150 may include, or work in conjunction with one or more backup components including a backup application that performs (or manages, coordinates, etc.) the creation and restoration of data that may be backed-up. The backup components may include a backup appliance such as a Dell EMC CloudBoost appliance, although any suitable appliance is contemplated. In addition, the backup components may include a backup server that may be implemented in conjunction with a Data Domain deduplication storage server provided by Dell EMC for use with Data Domain™ Restorer (DDR) storage devices. In some embodiments, the backup server may be a Dell EMC Avamar server or a Dell EMC Networker server, although no particular server is required, and other backup and storage system configurations are contemplated. It should be noted that components of the data protection system 150 (e.g., backup application, backup appliance, or backup server) can be implemented in various forms, such as a virtual, physical, or native public cloud appliance to fit the requirements of a particular configuration.

It should be noted that the database system 120 may be provided by (or belong to) a first entity, the data protection system 150 may be provided by (or belong to) a second, different, entity. For example, the database system 120 may be provided by first entity such as Oracle (e.g. Oracle database system), in which case the recovery manager 125, for example, may be an Oracle Recovery Manager (RMAN); the data protection environment 150 may be provided by a second entity such as Dell EMC, for example, as part of data protection and recovery service (e.g. software/platform-as-a-service), in which case the backup agent 115 may be part of a Dell EMC product (e.g. Dell EMC PowerProtect). It should be noted that in some embodiments, the data protection environment 160 may be provided as part of a cloud-based storage service (e.g., software/platform-as-a-service) provided by the third entity (e.g., Amazon S3, Microsoft Azure, IBM Cloud Object Storage, Google Cloud Storage, etc.). Accordingly, in some embodiments described herein, operations may be performed by the data protection system 150 and/or backup agent 115 such that the database system 120 may be considered a third-party service or product.

Although the disclosure described herein may apply to any database and backup configurations and systems, in some embodiments, the system may work in conjunction with an Oracle database system, and particularly, Oracle Recovery Manager (RMAN). In such embodiments, the following terminology may be used.

A "target database" may refer to a primary database that will be backed up for standby database creation. For example, the term "target database" identifies the database that is undergoing a backup, restore, or recovery operation by RMAN.

An "auxiliary database" may refer to a standby database that will be created as a result of the duplication (or backup) of the "target database." For example, an auxiliary database (or instance, or backup) identifies an instance which RMAN connects in order to execute the duplicate command. For instance, RMAN uses the second database (or instance) to restore and recover the required objects, which is called an auxiliary database (or instance).

A "backup set" is made of one or more such backup pieces. For example, data files, control files, parameter files, and archived log files in a RMAN specific format are called "backup pieces." A backup set is created using the "backup" command for RMAN.

FIG. 2 is a process flow diagram illustrating an example process flow for managing specialized control and parameter files used for a backup restore according to one or more embodiments of the disclosure. Process 200 may use processing logic, which may include software, hardware, or a combination thereof. For example, process 200 may be performed by a system including one or more components described in operating environment 100.

In 201, the system (e.g., backup agent 115) may monitor backups of a database (e.g., database 121) performed by a database system (e.g., database system 120). Each of the backups of the database may be stored to a remote storage system (e.g., data protection environment 160) as part of a backup chain. The backups may include a series of backups (e.g., sequential backups) that form a backup chain. The backup chain may be formed from one or more types of backups such as full, incremental, differential, synthetic, logs, etc. For example, the backup chain may include at least one of an incremental backup and a differential backup. As further described herein, the backup agent may identify an appropriate backup based on specialized information stored by the backup agent after each performed backup. As described, a backup agent may work in conjunction with the database system to provide data protection functionality.

In 202, the system may identify, after each backup, a corresponding control file and parameter file created by the database system as part of the backup. For example, after each backup performed by the database system (e.g., RMAN), the backup agent may identify a particular (i.e., corresponding) control file and parameter filed. For example, in some embodiments, each backup may be associated with (e.g., correspond to) a performed backup. As described, the control file may include information critical to perform a recovery.

The control file may include information of the physical structure of the database, and include the database name, names of locations of associated data files, online redo log files, timestamps (e.g., database creation timestamp), and various other types of information. In one embodiment, the control file may include an Oracle database control file.

The parameter file may include initialization parameters associated with the database. For example, the parameter file may include information such as a directory structure layout, memory allocation limits, etc. In one embodiment, the parameter file may include an Oracle database server parameter file ("SPFILE") or parameter file ("PFILE"). In such embodiments, the parameter file may include persistent initialization parameters. For example, a database may rely on the parameter file during startup to retrieve initialization information.

In one embodiment, identifying, after each backup, the corresponding control file may include querying the database to identify the control file. For example, the query may be an SQL query of an Oracle database. For example, an SQL query to identify to the control file may be as follows:

select bpd.set_stamp, bpd.handle from v$backup_piece_details bpd, v$backup_set_details bsd, where (bsd.CONTROLFILE_INCLUDED='YES' and bpd.set_stamp=bsd.set_stamp).

In one embodiment, identifying, after each backup, the corresponding parameter file may include querying the database to identify the parameter file. For example, the query may be an SQL query of an Oracle database. For example, an SQL query to identify to the parameter file may be as follows:

select bpd.set_stamp, bpd.handle from v$backup_piece_details bpd, v$backup_spfile bsp where bpd.set_stamp=bsp.set_stamp.

Accordingly, the results from one or both queries can be stored as metadata (e.g., metadata 118).

In 203, the system may store, after each backup, information of the corresponding control file and parameter file as part of an object (e.g., specialized object) associated with the backup. This information (or backup of the control file and/or parameter file) may be referred to as an "auxiliary backup" by the backup agent (e.g., Dell EMC PowerProtect). The object may be stored as part of metadata (e.g., metadata 118) managed by the backup agent. For example, the metadata may be managed exclusively by the backup agent, and as such, the metadata may not be accessible to the database system or recovery manager. The backup agent may create a special object for each backup that stores specific information of the backup. In some embodiments, the object (e.g., metadata) may be stored as part of the backup information associated with the backup. For example, in embodiments including an Oracle database system, the object may be stored with the backup copy of the database. As described, the backup copy may be managed by the backup agent. In some embodiments, the object associated with a backup copy of the database will be stored in specialized database managed by the backup agent for disaster recovery (e.g., Dell EMC PowerProtect Elastic Search Database).

Referring to FIG. 3, shown is an example layout of a specialized object (e.g., "ControlSPFileInfo" object) managed by the backup agent, and used to store information of the control file and parameter file corresponding to a backup. As shown, the object 310 may store information indicating whether each of the control file ("hasControlFile") and parameter file ("hasSPFile") is stored as part of the backup copy of the database. In addition, the object 310 stores information indicating a relative path (e.g., storage location) of particular files including the control file path ("ControlFilePath"), parameter file path ("SPFilePath"), and automatic backup path ("AutoBackupPath"). In other words, the object may store an indication of the storage location of at least one of the control file and the parameter file.

Referring back to FIG. 2, the backup agent may automatically initiate a procedure to perform a restore by retrieving the critical information by leveraging the information stored in the specialized object. In contrast, prior systems required a manual procedure to identify the critical information as part of a disaster recovery. Such a procedure is further described in operations 204-207.

In 204, the system may receive a request to initiate a restore of the database to a point in time. The request may specify a point in time to which the database is to be restored. In other words, a user may specify a time value instead of a particular backup that is part of the backup chain because the backup agent may automatically identify an appropriate backup based on the point in time. For example, as a part of a disaster recovery scenario, the backup agent may receive an instruction to restore the database in a situation where the database system may not be able to initiate a restore on its own.

In 205, the system may identify a particular backup of the database based on the point in time. More specifically, the backup agent may identify a particular backup at any point in the backup chain based on the point in time. As described, the backup chain may include various types of backups such as a full, incremental, differential, synthetic, logs, etc.

The backup agent may leverage stored information of the control file and/or parameter file (e.g., auxiliary backup) to identify the appropriate backup to restore. In some embodiments, each backup performed by the database system may be associated with an auxiliary backup. In other words, each backup performed may be associated with a particular instance of control file and/or parameter file information stored by the backup agent. For example, a specialized object (e.g., object 310) may be stored for each performed backup. In one embodiment, identifying the particular backup of the database based on the point in time may include determining a backup-end-time corresponding to the point in time, identifying an auxiliary backup having a backup-end-time after (e.g., greater than or equal to) the point in time, and selecting the backup associated with the identified auxiliary backup as the particular backup for the restore operation.

In some embodiments, the backup agent may identify the particular backup based on whether the particular backup is part of a complete or incomplete chain. The back agent may also reference a particular archive log when identifying the particular backup. For example, an archive log may include information about redo log files associated with the database.

In one embodiment, identifying the particular backup of the database based on the point in time may include determining whether the backup chain associated with the particular backup is a complete chain (e.g., frozen chain). The backup agent may determine a particular backup chain is a complete chain if there exists a successfully completed full backup after the particular chain. In other words, determining whether the backup chain associated with the particular backup is a complete chain may include determining the backup chain is complete based on identifying a successfully completed full backup after the backup chain. In response to determining the backup chain associated with the particular backup is a complete chain, the system may identify the particular backup based on the backup-end-time of backups in the next backup chain. The backup-end-time of the backups in the next backup chain may be determined based on the first archive log associated with the next backup chain.

Alternatively, the backup agent may determine a particular backup chain is an incomplete chain if there is no successfully completed full backup after the particular chain (e.g. a successfully completed full backup after the particular chain does not exist). In response to determining the backup chain associated with the particular backup is an incomplete chain, the system may identify the particular backup based on the backup-end-time of the last archive log backup which is later than the backup-end-time. Accordingly, based on the selected archive log backup, the backup agent will identify (or select) the auxiliary backup having a backup-end-time after (e.g., greater than or equal to) the selected archive log backup.

Accordingly, the backup agent may identify the particular backup at any point in time in the backup chain.

In 206, the system may retrieve the information of the corresponding control file and parameter file from the object associated with the particular backup of the database. The system may identify the object from which to retrieve the information based on the particular backup of the database identified in 205. For example, as described above, after each backup, the backup agent stores the corresponding control file and parameter file information for the backup. Accordingly, the backup agent may now automatically retrieve the appropriate control file and parameter file information required for the restore process. As described, this automatic process provides an additional layer of recovery functionality since the backup agent does not necessarily need to access data from a production environment. Instead, the information may be retrieved from metadata maintained exclusively by the backup agent.

In 207, the system may initiate the restore of the database from the remote storage system using the retrieved information of the corresponding control file and parameter file.

In one embodiment, initiating the restore of the database from the remote storage system using the retrieved information of the corresponding control file and parameter file may include providing the retrieved information to a recovery manager (e.g., RMAN) that uses the retrieved information to perform a restore of the database. For example, the recovery manager may determine the physical structure, name, associated data files, etc. of the database to be restored along with appropriate initialization parameters for the database to be restored.

Thus, the system may provide the ability to perform an automated restore by efficiently identifying and storing critical information, and then automatically retrieving such information to initiate a recovery in various circumstances including a disaster recovery scenario.

Figure 4:
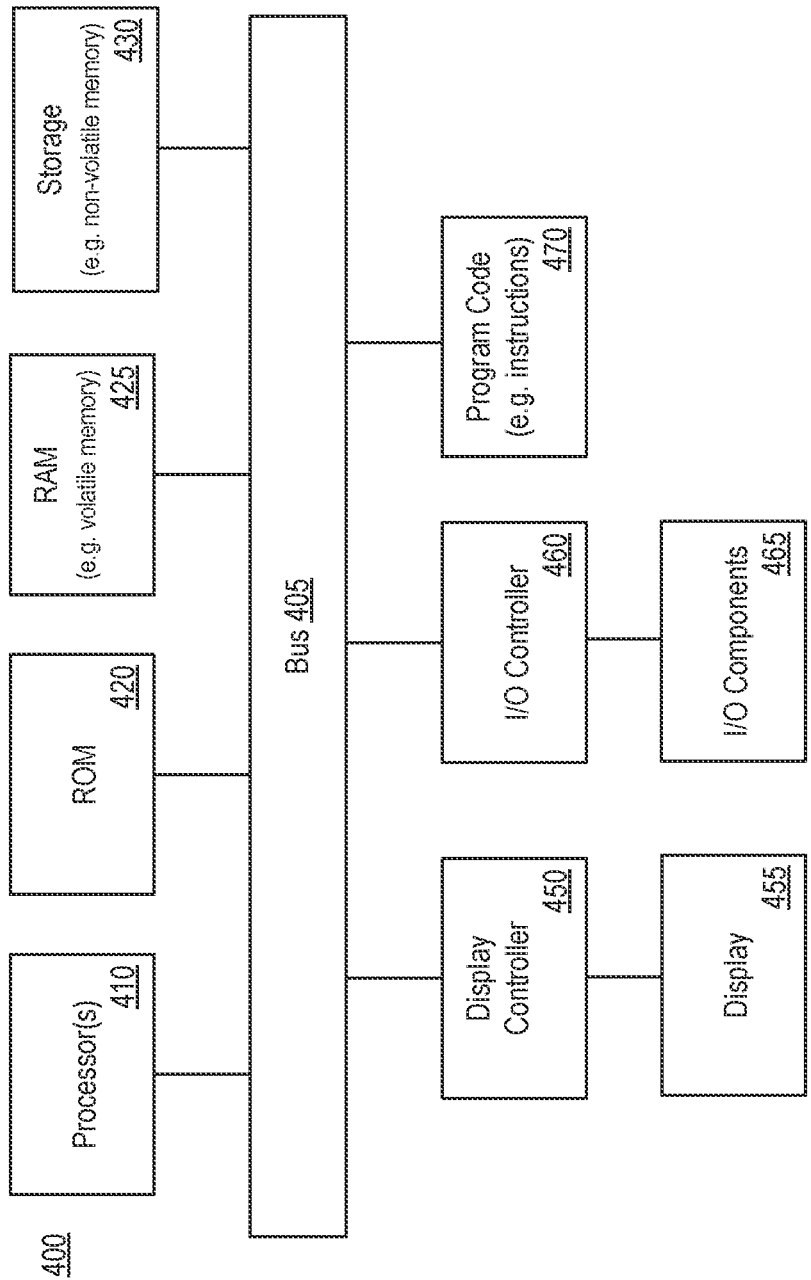
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g., systems 120, 150, 160, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g., within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g., within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g., accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g., data protection system 150, backup agent 115, etc.). Program code 470 may reside, completely or at least partially, within the memories described herein (e.g., non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
monitor, by a backup agent, performance of backups of a database performed by a database system, each of the backups of the database stored to a remote storage system as part of a backup chain;
identify, by the backup agent and for each backup in the backup chain, a corresponding control file and parameter file created by the database system as part of the backup, the corresponding control file and parameter file being identified in response to a backup being performed;
store, by the backup agent and for each backup in the backup chain, information of the corresponding control file and parameter file as part of an object associated with the backup in response to the backup being performed and the corresponding control file and parameter file being identified, the object stored as part of metadata managed by the backup agent;
receive, by the backup agent, a request to initiate a restore of the database to a point in time;
identify, by the backup agent, a particular backup of the database based on the point in time;
retrieve, by the backup agent, the information of the corresponding control file and parameter file from the object associated with the particular backup of the database; and
initiate, by the backup agent, the restore of the database from the remote storage system using the retrieved information of the corresponding control file and parameter file.

2. The system of claim 1, wherein identifying the particular backup of the database based on the point in time includes:
determining a backup-end-time corresponding to the point in time; and
selecting the particular backup based on the backup-end-time.

3. The system of claim 1, wherein identifying the particular backup of the database based on the point in time includes determining whether the backup chain associated with the particular backup is a complete chain, and wherein the plurality of instructions, when executed, further cause the one or more processors to:
in response to determining the backup chain associated with the particular backup is complete chain, identifying the particular backup based on the backup-end-time of backups in the next backup chain.

4. The system of claim 3, wherein determining whether the backup chain associated with the particular backup is a complete chain includes determining the backup chain is complete based on identifying a successfully completed full backup after the backup chain.

5. The system of claim 3, wherein the backup-end-time of backups in the next backup chain are determined based on the first archive log associated with the next backup chain.

6. The system of claim 1, wherein identifying the corresponding control file and parameter file created by the database system as part of the backup includes querying the database to identify the control file or the parameter file.

7. The system of claim 1, wherein the object stores an indication of the storage location of at least one of the control file and the parameter file.

8. The system of claim 1, wherein the backup chain includes at least one of an incremental backup and a differential backup.

9. A method comprising:
monitoring, by a backup agent, backups of a database performed by a database system, each of the backups of the database stored to a remote storage system as part of a backup chain;
identifying, by the backup agent and for each backup in the backup chain, a corresponding control file and parameter file created by the database system as part of the backup, the corresponding control file and parameter file being identified in response to a backup being performed;
storing, by the backup agent and for each backup in the backup chain, information of the corresponding control file and parameter file as part of an object associated with the backup in response to the backup being performed and the corresponding control file and parameter file being identified, the object stored as part of metadata managed by the backup agent;
receiving, by the backup agent, a request to initiate a restore of the database to a point in time;
identifying, by the backup agent, a particular backup of the database based on the point in time;
retrieving, by the backup agent, the information of the corresponding control file and parameter file from the object associated with the particular backup of the database; and
initiating, by the backup agent, the restore of the database from the remote storage system using the retrieved information of the corresponding control file and parameter file.

10. The method of claim 9, wherein identifying the particular backup of the database based on the point in time includes:
determining a backup-end-time corresponding to the point in time; and
selecting the particular backup based on the backup-end-time.

11. The method of claim 9, wherein identifying the particular backup of the database based on the point in time includes determining whether the backup chain associated with the particular backup is a complete chain, and wherein the method further comprising: in response to determining the backup chain associated with the particular backup is complete chain, identifying the particular backup based on the backup-end-time of backups in the next backup chain.

12. The method of claim 11, wherein determining whether the backup chain associated with the particular backup is a complete chain includes determining the backup chain is complete based on identifying a successfully completed full backup after the backup chain.

13. The method of claim 11, wherein the backup-end-time of backups in the next backup chain are determined based on the first archive log associated with the next backup chain.

14. The method of claim 9, wherein identifying the corresponding control file and parameter file created by the database system as part of the backup includes querying the database to identify the control file or the parameter file.

15. A computer program product comprising a non-transitory computer-readable medium having a computer-readable program code embodied therein to be executed by one or more processors, the program code including instructions to:

monitor, by a backup agent, backups of a database performed by a database system, each of the backups of the database stored to a remote storage system as part of a backup chain;

identify, by the backup agent and for each backup in the backup chain, a corresponding control file and parameter file created by the database system as part of the backup, the corresponding control file and parameter file being identified in response to a backup being performed;

store, by the backup agent and for each backup in the backup chain, information of the corresponding control file and parameter file as part of an object associated with the backup in response to the backup being performed and the corresponding control file and parameter file being identified, the object stored as part of metadata managed by the backup agent;

receive, by the backup agent, a request to initiate a restore of the database to a point in time;

identify, by the backup agent, a particular backup of the database based on the point in time;

retrieve, by the backup agent, the information of the corresponding control file and parameter file from the object associated with the particular backup of the database; and initiate, by the backup agent, the restore of the database from the remote storage system using the retrieved information of the corresponding control file and parameter file.

16. The computer program product of claim 15, wherein identifying the particular backup of the database based on the point in time includes:

determining a backup-end-time corresponding to the point in time; and selecting the particular backup based on the backup-end-time.

17. The computer program product of claim 15, wherein identifying the particular backup of the database based on the point in time includes determining whether the backup chain associated with the particular backup is a complete chain, and wherein the program code including further instructions to:

in response to determining the backup chain associated with the particular backup is complete chain, identifying the particular backup based on the backup-end-time of backups in the next backup chain.

18. The computer program product of claim 17, wherein determining whether the backup chain associated with the particular backup is a complete chain includes determining the backup chain is complete based on identifying a successfully completed full backup after the backup chain.

19. The computer program product of claim 17, wherein the backup-end-time of backups in the next backup chain are determined based on the first archive log associated with the next backup chain.

20. The computer program product of claim 15, wherein identifying the corresponding control file and parameter file created by the database system as part of the backup includes querying the database to identify the control file or the parameter file.

* * * * *